United States Patent [19]
Ehlert

[11] Patent Number: 5,718,744
[45] Date of Patent: Feb. 17, 1998

[54] LUBRICATION SYSTEM DEMISTING APPARATUS

[75] Inventor: Charles W. Ehlert, Katy, Tex.

[73] Assignee: Lubrication Systems Company of Texas, Inc., Houston, Tex.

[21] Appl. No.: 596,713

[22] Filed: Feb. 5, 1996

[51] Int. Cl.[6] ....................... B01D 46/00
[52] U.S. Cl. .............. 96/189; 55/210; 55/385.1; 55/466; 55/467; 96/192; 184/6.23; 184/6.24
[58] Field of Search ............... 95/273; 96/188, 96/189, 191, 193, 192, 187; 55/210, 466, 467, 471, 472, 385.1, DIG. 17; 184/6.21, 6.23, 6.24, 6.26

[56] References Cited

U.S. PATENT DOCUMENTS

| | | | |
|---|---|---|---|
| 2,379,579 | 7/1945 | Hunter | 96/187 |
| 2,689,080 | 9/1954 | Preiss | 55/467 |
| 2,828,818 | 4/1958 | Wright | 96/192 |
| 3,016,977 | 1/1962 | Schweitzer et al. | 96/189 |
| 3,265,295 | 8/1966 | Cyr | 55/467 |
| 3,353,340 | 11/1967 | Carsey | 55/466 |
| 3,415,041 | 12/1968 | Kraissl, Jr. | 55/466 |
| 3,633,341 | 1/1972 | Langlois | 96/190 |
| 4,263,029 | 4/1981 | George | 55/466 |
| 4,878,923 | 11/1989 | Muller | 55/466 |
| 4,903,462 | 2/1990 | Nagashima et al. | 55/466 |

*Primary Examiner*—Duane S. Smith
*Attorney, Agent, or Firm*—Bill B. Berryhill

[57] ABSTRACT

Demisting apparatus for separating oil and air from oil mist supplied thereto and including an enclosed reservoir into which the oil mist may flow; a filter device connected to the reservoir; and a blower having its suction connected to an upper portion of the reservoir for drawing oil mist therefrom and having its discharge connected to the filter device. The filter device includes a filter element through which oil mist discharged from the blower may pass for separating oil and air therein, at least some of the air venting to the atmosphere through a first portion of the filter device, the oil draining through another portion of the filter device for collection in the reservoir.

16 Claims, 2 Drawing Sheets

LUBRICATION SYSTEM DEMISTING APPARATUS

BACKGROUND OF THE INVENTION

1. Field of the Invention

The present invention pertains to lubrication systems for lubricating the bearings of bearing equipped items. More specifically, the present invention pertains to oil mist lubrication systems in which an oil mist is formed, distributed to bearings to be lubricated and returned for reuse. Even more specifically, the present invention pertains to demisting apparatus for use in an oil mist lubrication system to separate air and oil from returned oil mist, the oil for reuse and oil-free air for release to the atmosphere.

2. Description of the Prior Art

For many years bearings have been lubricated by various means. In early lubrication systems, bearings were lubricated by "one shot" application of grease and/or oil to a grease or oil fitting with a grease gun or oil can. Although attempts were made to apply the grease or oil at needed periodic frequencies, it is obvious that at times too much oil and/or grease was used, and at other times, not enough oil and/or grease was provided for lubrication. For this reason, lubrication systems which apply the lubricant at timed, periodic intervals or on a continuous basis, were developed.

U.S. Pat. No. 4,445,168 discloses a microcomputer controlled lubrication system which monitors and controls lubrication. In this system, individual "shots" of lubricant are periodically delivered based on either a time cycle or a machine stroke cycle. Other systems, such as the one disclosed in U.S. Pat. No. 4,527,661 utilize what is referred to in the industry as an "air—oil lubrication system" in which separate oil and air streams are brought to and combined by a mixing device, i.e. an atomizer, at a point immediately adjacent to the bearing being lubricated. However, such systems require two sets of piping (one for oil and one for air) and individual mixing devices at each point of lubrication.

In more recent years, oil mist lubrication systems have been developed to provide continuous, effective lubrication to anti-friction bearings of rotating equipment such as centrifugal pumps, electric motors, steam turbines, gear boxes, blowers, and fans. An oil mist lubrication system typically comprises an oil mist generator in which a compressed air stream in turbulent flow is combined with a liquid lubricant to create a fine mist of oil particles suspended in an air stream. These oil particles are typically one to five microns in diameter. The oil mist is transported through a piping system and delivered into the bearing housings of rotating equipment. The oil mist continuously bathes the bearings of the equipment and maintains a slight positive pressure in the bearing housing to reduce contamination from outside sources. An early example of such a system is disclosed in U.S. Pat. No. 3,665,684.

When oil mist is generated, the oil is atomized into very fine particles so that the oil mist will remain stable and can be transferred relatively long distances with minimum wetting out on the walls of the pipe in which it is being conveyed. These fine particles, referred to as "dry mist", must be converted into larger particles, referred to as "wet mist", in order to wet out on the metal surfaces of the equipment bearings being lubricated. This is accomplished by passing the dry mist through a specially designed restriction orifice known as a "reclassifier". The reclassifier creates turbulence in the oil mist stream. The small particles then agglomerate into larger ones (wet mist) which then enter the equipment bearing housing. These reclassifiers serve the additional purpose of metering the amount of lubricant to each bearing to avoid over or under lubrication. Selection of the correct reclassifier for each application point in the system is based upon an understanding of the exact bearing configuration (size, speed, load factors, etc.) for each piece of equipment to be lubricated.

An especially advanced oil mist lubricating system is disclosed in U.S. Pat. No. 5,125,480. It includes an air supply, the inlet of which is connected to a source of pressurized air; an oil supply; an oil mist generator connected to the air supply and the oil supply and by which air and oil therefrom are combined in an oil mist for distribution; and microprocessor control means for controlling and monitoring the operating conditions of the system. Such a system provides for continuous lubrication of the bearings of rotating equipment with greatly improved monitoring and control characteristics. Operating variables of the system are maintained within desired limits and oil consumption and oil mist density are accurately controlled, reducing oil consumption and environmental pollution.

Even though recent oil mist systems, such as the one disclosed in U.S. Pat. No. 5,125,480, offer much more effective and efficient lubrication, such systems, unfairly in many cases, are criticized for environmental pollution. It is true that some of the oil mist particles, particularly the smallest ones, do not wet out on the metal surface of the equipment being lubricated. They may pass through bearing housings and vent to the atmosphere. In addition, although much less excess oil may accumulate near the lubricated bearings in an oil mist lubrication system, a certain amount of excess oil will accumulate. In the past, collection vessels have been provided, whether in oil mist systems or in the older conventional lubricating systems, to collect the excess oil for periodic recovery, reuse or proper disposal. Many times, however, the excess oil is collected in an open container susceptible to contamination by rain water or other substances. In many obsolete systems, such oil was simply drained to sewers.

U.S. Pat. No. 5,318,152 discloses an improved oil mist lubrication system for continuous lubrication of a plurality of bearings which includes an oil mist generator and a distribution assembly connected to the oil mist generator to distribute the oil mist to the bearings to be lubricated. The distribution assembly includes a supply header through which the dry oil mist is distributed and at least one reclassifier for converting the dry oil mist to a wet oil mist just prior to application to the bearings to be lubricated. The system also provides collection means which comprises an enclosed container to which drain lines from the bearings are connected and into which excess oil and oil mist from the bearings may flow and accumulate. The collection means may also comprise a pump, the inlet of which communicates with oil in the enclosed container and the outlet of which is connected to a return piping by which excess oil and oil mist are returned for recycling and reuse. The return piping includes a return header through which oil and oil mist are returned to an oil/collection supply vessel. The oil collection/supply vessel may be provided with a demisting filter by which excess oil mist is separated into oil and oil-free air, the oil accumulating in the oil collection/supply vessel and the oil-free air being vented therefrom. Oil collected in the oil collection/supply vessel may then be rerouted to the oil mist generator for recycling through the system.

The improved lubrication system of U.S. Pat. No. 5,318,152, provides continuous lubrication of bearings with superior monitoring and control characteristics. In addition, the improved oil mist lubrication system of the present invention, provides a superior system in which the lubricant is distributed, collected and recycled in a completely enclosed loop to eliminate the environmental concerns associated with potentially escaping or stray oil mist and oil accumulation of prior systems.

There are many beneficial characteristics of the "closed loop" oil mist systems. First and foremost, machine reliability and performance are improved by reducing bearing failures, excluding contaminants from bearing housings and eliminating over or under lubrication. Equipment bearings run cooler and energy is conserved. Most importantly, the improved closed loop oil mist lubrication systems meet much higher environmental standards. Emissions are reduced because oil mist vents to atmosphere are eliminated. No oil or oil mist is directed to equipment base plates or sewers, resulting in safer, cleaner operations. Oil consumption and used oil disposal costs are reduced because oil and oil mist are continuously collected, filtered and reused. Potential spills are minimized since open containers are no longer needed for routine filling and draining of equipment. Hydrocarbon load as contributed by the oil mist system on effluent treatment facilities is virtually eliminated. Oil container disposal and handling problems and costs are avoided because there is no need for oil drums or totes. In addition there is no escaping or stray mist to contaminate or contact products being produced by the machinery being mist lubricated. This is especially critical in the man-made fiber and paper industries.

A critical component of closed loop oil mist lubrication systems, such as the one disclosed in U.S. Pat. No. 5,318,152, is the apparatus to which excess oil and oil mist are returned for recycling and reuse. This apparatus is preferably provided with filter elements by which returned oil mist may be separated into oil and oil-free air, the oil for collection and reuse and the oil-free air for venting to the atmosphere. The filter apparatus may include a recirculating blower by which the returning oil mist may be forced or drawn through filter elements. If the recirculating blower which is typically in communication with and totally supplied by the return header through which the oil mist is returned draws a vacuum, such an arrangement may result in an uncontrolled vacuum or negative pressure in the oil mist system.

The vacuum problem created in such systems could be addressed by having one end of the return header open to the atmosphere. However, this makes the system intrusive to outside contamination. Introduction of humidity, water, and dust, dirt or other corrosive elements can render the oil unacceptable for reuse in the oil mist generator of such a system without special cleaning and conditioning. In addition, the success of demisting depends on using filter media that captures submicron size particles. If contamination of the returning mist stream is allowed, the service life of the filter media is greatly reduced.

Another way to control pressure and to reduce the vacuum problem just described is to directly bypass a part of the blower discharge into its suction. This would require delicate control of a valve to maintain a true atmospheric reference pressure in the return header. Such a system would be more mechanically complicated, require continuous monitoring and be more costly to manufacture. Other problems could arise if the blower, blower motor or pressure control system were to fail or if the filter media were to become loaded with particulate.

It is important that the return oil mist header in a closed loop oil mist system, such as U.S. Pat. No. 5,318,152, remain at atmospheric pressure. In addition to the reasons stated heretofore, if the header is operated at a vacuum, contamination may be drawn into the lubricated bearings. If the return header operates under any back pressure, oil mist may escape from around shaft seals and bearing seals and vent to the atmosphere, thereby compromising the objectives of installing a closed loop oil mist system.

Another important consideration of a closed loop oil mist system is what happens if the blower motor fails or if the filter becomes plugged with particulate. The amount of pressure required to push the oil mist through the filter media, after it has been saturated with oil, is greater than the operating mist header pressure in the mist supply system. Experience has shown that filter media capable of satisfactorily removing oil from oil mist requires a pressure of 45" to 60" water to move the oil mist stream through the filter media. Oil mist supply header pressure is normally operated at 20" water. In systems where the blower discharges directly into the filter, whether having a manual or an auto control pressure control, if any of the components fail, the return header immediately becomes pressurized. This is due to the fact that the only way for the mist to escape is for it to be pushed through the filter media. When the return header becomes pressurized, mist flow to the bearings being lubricated can become altered, subjecting the machinery being serviced to the risk of bearing failure.

Thus, it is evident that the apparatus to which excess oil and oil mist are returned for recycling and reuse is a critical part of a closed loop oil mist lubrication system. It must be so designed that it does not fail or create vacuum and pressure problems during operation of the system.

SUMMARY OF THE PRESENT INVENTION

The present invention is directed primarily to demisting apparatus for separating oil and air from oil mist lubrication systems in which the oil mist is being returned for recycling and reuse. The demisting apparatus of the present invention may include an enclosed reservoir into which the returned oil mist may flow. A filter assembly is connected to the reservoir, a first portion of which is vented to the atmosphere and another portion of which opens to the interior of the reservoir. The apparatus also includes a blower having its suction connected to an upper portion of the reservoir for drawing oil mist therefrom and having its discharge connected to the filter assembly. The filter assembly includes a filter element through which oil mist discharged from the blower may pass for separating oil and air therein. At least some of the oil-free air vents to the atmosphere through the first portion of the filter assembly. The oil drains through another portion of the filter assembly for collection in the reservoir.

In a preferred embodiment of the invention, the blower discharge may be connected to the filter assembly by first conduit. A second conduit may also connect the first conduit directly to the reservoir so that a portion of the oil mist being discharged from the blower may be returned to the reservoir without passing through the filter assembly. In another embodiment, another conduit may also connect the filter assembly to the reservoir so that a portion of the air separated by the filter element may be returned directly to the reservoir rather than being vented to the atmosphere.

The demisting apparatus of the present invention automatically adjusts itself to operate at atmospheric pressure. Under normal operating conditions, the discharged air volume always equals the input mist volume. If the blower or its motor completely stops running or if the filter element becomes completely blocked, oil mist would simply flow freely through the filter assembly and vent to the atmosphere. The escaping mist would usually give an obvious indication that the system needed attention. In some embodiments of the invention, an oil mist detection device would be placed in the filter discharge to provide a remote indication that oil mist was by-passing the filter. In neither case would serviced machinery bearings be placed in jeopardy for failure of lubrication.

Thus, the demisting apparatus of the present invention is especially suitable for use with a closed loop oil mist lubricating system. It automatically adjusts to operate at atmospheric pressure so that there is no problem associated with a vacuum or an increased pressure in the system. It is relatively simple in construction and operation. Many other objectives and advantages of the invention will be apparent from reading the description which follows in conjunction with the accompanying drawings.

DESCRIPTION OF THE PREFERRED EMBODIMENTS

Figure 1:
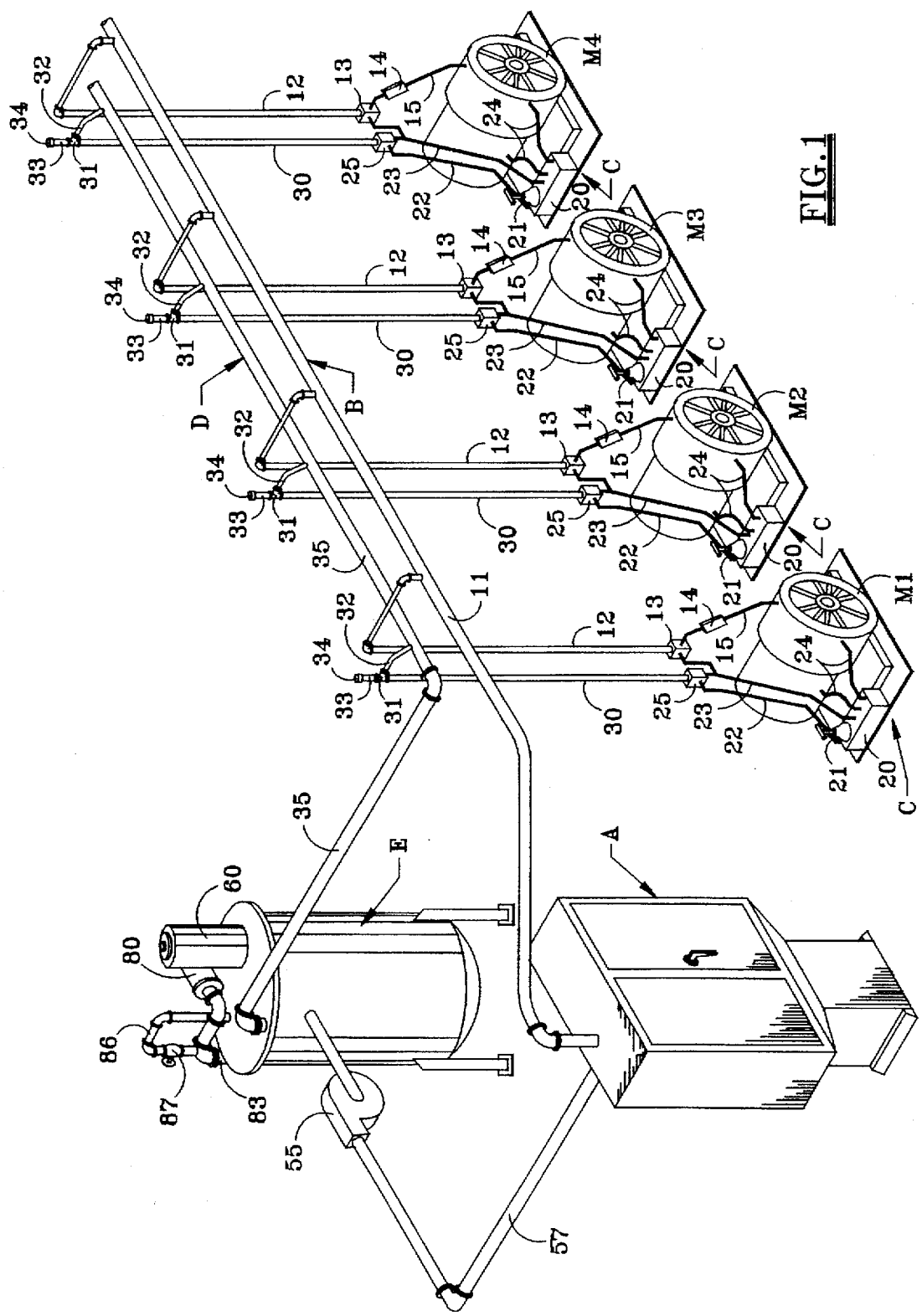
FIG. 1 is a pictorial illustration of a closed loop oil mist lubrication system utilizing demisting apparatus, according to a preferred embodiment of the invention.

Referring first to FIG. 1, there is shown an improved oil mist lubricating system for continuous closed loop lubrication of a plurality of bearings of one or more bearing equipped items. For illustration purposes only, the system shown is being used to lubricate the bearings of electric motors M1, M2, M3 and M4. Of course, the system could be used to lubricate many other numbers and types of bearing equipped items such as centrifugal pumps, electric motors, steam turbines, gear boxes, blowers, fans, etc.

The oil mist lubrication system of the present invention may comprise an oil mist generator A; a distribution assembly, generally designated B; collection means C; a return assembly, generally designated D, and demisting and oil collection/supply apparatus E.

The oil mist generation means, generally represented as A in FIG. 1, could be of a number of designs. An extremely effective and efficient oil mist generator is described in the aforementioned U.S. Pat. No. 5,125,480. For present purposes, it is sufficient to understand that the oil generation means A is connected to a source of compressed air and a source of oil, e.g. the demisting and oil collection/supply apparatus E. The oil and air are properly heated, pressure and flow regulated and brought together in an oil mist generating head, creating an oil mist in which the oil is atomized into very fine particles which can be conveyed over long distances with a minimum wetting out on the walls of pipe through which it is being conveyed. These fine particles, are generally referred to as a "dry mist" in which the oil particles are typically one to five microns in diameter.

The distribution assembly B transmits the dry mist from the mist generator A to individual points of lubrication such as the closed bearing housing (not shown) of the electric motors M1, M2, M3 and M4. The distribution assembly B may include a supply header 11 connected to the oil mist generator A and branching off of which are a number of mist supply conduits 12 for supplying oil mist to the individual points of lubrication. The supply header 11 and the generally horizontal portions of the mist supply lines 12 preferably slope slightly downwardly in a direction toward the mist supply generator A.

The distribution assembly B may also include an oil mist manifold 13 having an inlet connected to the mist supply conduit 12 and one or more outlets of which are connected to reclassifiers 14 which are in turn connected through oil mist conduits 15 to the bearing housings (not shown) of motors M1–M4. As previously explained, the purpose of reclassifiers 14 is to convert the small particles of oil in the dry mist supplied through the mist manifold 13 to larger particles of oil (wet mist) for application to the bearing housings. The particular reclassifier 14 is selected for the type of bearing to which the oil mist is supplied.

For present purposes, it is sufficient to understand that as dry oil mist is brought into the oil mist manifold 13 through the oil mist supply line 12, the oil mist is then distributed to one or more reclassifiers, such as reclassifiers 14. Should oil particles coalesce in the supply conduits and the oil mist manifold 13, the oil will accumulate and be visible through a sight tube (not shown). Should the oil in the oil mist manifold 13 reach a significant level, it may be discharged through a valve (not shown) therein. Any accumulated oil and perhaps some oil mist will therefore be discharged to oil collection components C of the invention which may include oil collection containers 20. Outlets provided at the manifold 13 may be connected through conduits to the collection container 20 for draining coalesced oil that may accumulate in the manifold 13.

The collection container 20 is essentially a closed tank provided with one or more inlets through which oil or oil mist may flow into the container 20. For example, one of these inlets may be connected to a drain line from the bearing housing of motors M1–M4 for collecting oil and/or oil mist therefrom. In addition, one of these inlets may be connected to a conduit through which oil and/or oil mist may be directed from the mist manifold 13. The container 20 may also be provided with a plugged drain outlet (not shown) through which the container 20 may be drained if necessary.

Attached to the collection container 20 is a hand operated pump 21. The pump 21 has an outlet port which may be connected, via a conduit 22, to the manifold 25 through a check valve connection. When the oil reaches a level at which it should be removed from the oil collection container 20, an operator manually operates the pump 21 forcing fluids in the conduit 22, through the return manifold 25 and additional components of the return assembly D.

Connected to an outlet port of the manifold 25 is a vertical tubular conduit or oil riser 30. Concentrically disposed in the vertical oil riser 30 is a tubular mist vent riser (not shown), the lower end of which is sealingly engaged with an inlet port of the manifold 25. This provides an annular flow passage between the internal walls of the oil riser 25 and the external walls of the mist riser. Each return oil riser 25 is connected to a tee fitting 31 and a slightly sloping downwardly generally horizontal conduit 32 which is connected to the return header 35. The riser 30 has an extended portion 33 which is connected to one branch of the tee 31 for extension, e.g. eighteen inches, above the conduit 32. The upper end of extension 33 is closed by a cap 34. The oil mist riser (not shown), rises concentrically upwardly through the return oil riser 30, the tee 31 and the riser extension 32 terminating at a point slightly below the cap 34. The oil mist vent is opened at its upper end.

It is important at this point to understand the function of the return manifold 25. As the supply manifold 13 accumulates coalesced oil, a manual valve (not shown) may be momentarily opened for draining. The accumulated oil is discharged into a mist vent conduit 23 between the oil collection container 20 and the return manifold assembly 25. The displaced oil drains by gravity down the vent 23 into the oil collection container 20. Coalesced oil and mist discharge from the bearing housings of M1–M4 and travels through conduits 24 to the oil collection container 20. A continuous flow of this oil mist travels through conduit 23 which communicates with the collection container 20. This oil mist flows to the return manifold 25 where it then rises through the oil mist vent tube concentrically disposed in return oil riser 30, exiting the upper end thereof (at a point above the return line 32), and then flows through the annular space surrounding the upper end of the oil mist vent tube within the riser extension 33. The oil mist then continues to flow through the upper sections of the return lines 32 and return header 35 toward the demisting and oil collection/supply apparatus E generally depicted in FIG. 1. Oil being collected in the oil container 20 is pumped out of the container by the pump 21 through the conduit 22 and the annular space between the oil riser 30 and the oil mist riser therein. The oil is pumped upwardly through the riser 30 exiting through the horizontal branch of tee 31 into the return lines 32 and return header 35 for eventual return to the demisting and oil collection/supply apparatus generally depicted at E in FIG. 1.

The return manifold 25, return riser 30, the oil mist vent return concentrically disposed therein, and the return lines 32 and return headers 35 are all components of the return assembly D. The oil and oil mist returning through the return assembly D, specifically that collected in return header 35, flow to the demisting and oil collection/supply apparatus generally depicted at E in FIG. 1 and shown in greater detail in FIG. 2.

Although the oil mist generator A, distribution assembly B, collection means C and return assembly D have been described in some detail, much greater detail of these components are given in U.S. Pat. No. 5,125,480. It should also be understood that the oil mist lubrication system described herein and in U.S. Pat. No. 5,125,480 represents a configuration used primarily in petrochemical and refining industries. However, the demisting and oil collection/supply apparatus E to which the present application is specifically directed has application in many other industries. In other industries, such as textiles and pulp and paper, installation of the oil collection containers manual pumps and return manifold assemblies may not be necessary. In these applications, the machinery being oil mist lubricated is typically located in multistory buildings. The oil mist generator and demisting tank are located at floor elevations below the serviced equipment. The supply and return header is then located near the ceiling/under the equipment floor level. All of the supply mist travels upward and all of the return mist and coalesced oil drains downward into the return header. The need for collection containers and the like is eliminated.

Figure 2:
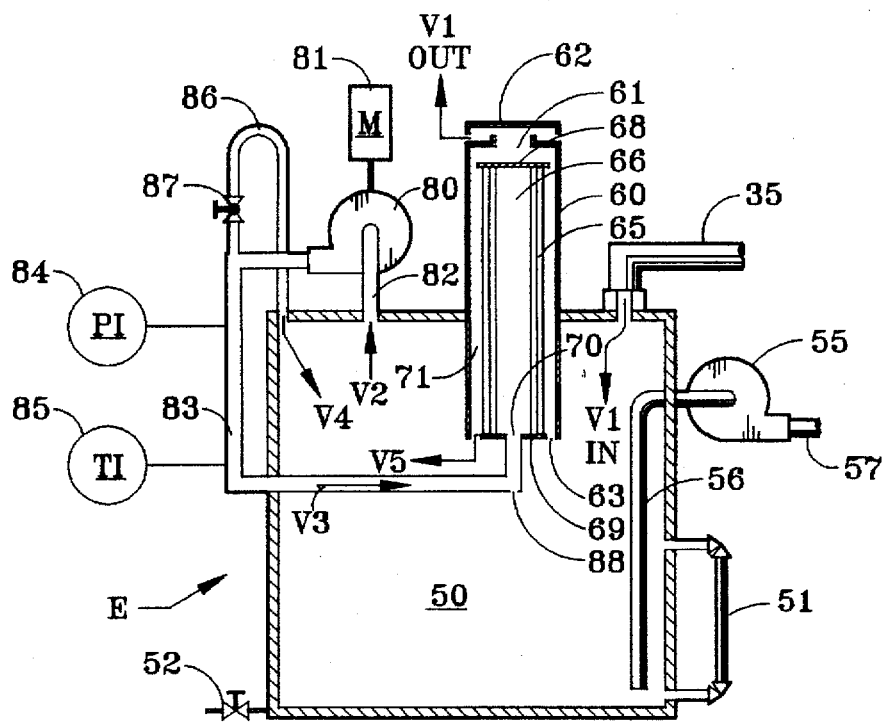
FIG. 2 is a schematic representation of demisting apparatus suitable for use with an oil mist lubrication system, such as the one shown in FIG. 1 according to a preferred embodiment of the invention.

Referring now to FIG. 2, the return header 35 in which oil mist and coalesced oil flows is connected to the reservoir 50 of demisting oil collection/supply apparatus E. The volume of oil mist being returned may be less than or equal to the capacity of the blower and may be designated V1 IN. The level of oil in the reservoir 50 can be determined by a level gauge 51. A drain valve 52 may be provided near the bottom of the reservoir. A pump 55, having an intake conduit 56 from the reservoir 50 of the demisting oil collection/supply apparatus E, may be installed for transferring the collected oil from the reservoir 50 through a conduit 57 to the mist generator A of FIG. 1 for recycling. (See also FIG. 1).

Attached to and extending upwardly from the reservoir 50 is a filter assembly which is housed in a tubular housing 60. The upper portion of the housing 60 is vented through an opening 61 to the atmosphere. A vent cap 62 protects the inner parts of the filter assembly from the elements. The lower portion of the housing 60 opens through an annular passage 63 into the interior of the reservoir 50. Centrally disposed within the filter housing 60 is an elongated filter element 65 having a hollow interior 66. The upper end of the filter element 65 and the hollow interior 66 are closed by an end plate 68. The lower end of the filter element is closed by a lower end plate 69 which is provided with an opening 70 into the interior 66. Thus, there is a generally cylindrical chamber 66 on one side of the filter element 65 and an annular chamber 71 on the other side of the filter element 65.

Mounted on the reservoir 50 is an air blower 80 and a motor 81 for operation thereon. The suction of the air blower 80 is connected through a conduit 82 to the upper part of the reservoir 50. The discharge of the blower is connected through another conduit 83 and opening 70 to the interior 66 of the filter element 65. A pressure gauge 84 and temperature gauge 85 may be attached to the conduit 83 to measure pressure and temperature of oil mist on the discharge side of the blower 80.

In a preferred embodiment, a smaller conduit 86 may be provided for communication between the conduit 83 and an upper portion of the reservoir 50. This conduit may also be provided with a hand operated control valve 87.

Before the lubrication system of FIG. 1 is started, it can be assumed that no oil or oil mist is flowing from the return header 35 into the reservoir 50. When started, the air blower 80 pushes clean air through the demisting filter element 65. At start-up the demisting filter element 65 will be clean and dry, and operate at very little pressure drop. All of the blowers inlet flow volume V2 is satisfied by its own discharge volume V3 after the air passes through the conduit 83 and the demisting filter element 65 returning through the annular opening 63 as volume V5. Assuming that the control valve 87 is closed, all of the blower throughput is circulated from the reservoir 50 to the blower 80, through the filter 65 and back into the reservoir 50. Thus, on initial start up, V2=V3=V5.

Once oil mist begins to be introduced into the reservoir 50 through the return header 35, the required blower suction volume V2 is made up by combining the mist inlet volume V1 IN with the filter outlet volume V5. The blower discharge volume V3 now splits inside of the demisting filter housing 60. Part of the flow V5 returns to the reservoir 50 and part of the flow V1 OUT is vented to the atmosphere through an opening 61. As oil mist inlet volume V1 IN varies, the amount of the filter discharge V5 which contributes to the blower suction automatically adjust so that V2=V1 IN+V5. Since the filter housing is vented to atmosphere without restriction, the demisting reservoir 50 also remains at an atmospheric pressure reference. This is vital for assuring that the oil mist flow is not restricted as it vents from bearing housings which the system lubricates.

As the system operates, the demisting oil filter element 65 becomes saturated with oil, causing the blower discharge pressure to increase. As the pressure drop across the filter increases, there is a corresponding increase in discharge pressure at the blower 80. The pressure indicator 84 and temperature indicator 85 are installed to monitor this pressure and temperature. If operating conditions create a high operating temperature, the manual blower discharge pressure control valve 87 may be opened to decrease the discharge pressure, resulting in lower operating discharge temperature. Now the blower suction volume V2=V1 IN+V4+V5. The air flow that discharges from the filter element 65 continues to split. A part is vented to the atmosphere V1 OUT and part returns to the reservoir 50 V5. The downward flowing air acts as a barrier to prevent unfiltered mist from escaping to the atmosphere which might otherwise flow up through the annular chamber 71 of the housing.

A small bleed hole 88 may be drilled in the conduit 83 directly below the filter opening 70. This is necessary to drain any liquid oil that may coalesce and collect in the conduit 83. As previously indicated the reservoir 50 is equipped with an oil level gauge 51 for monitoring the oil level. A pump 55 may be connected to a conduit 57 to transfer collected oil back to the oil mist generator so that oil collected may be reused and reapplied to machinery bearings.

Figure 3:
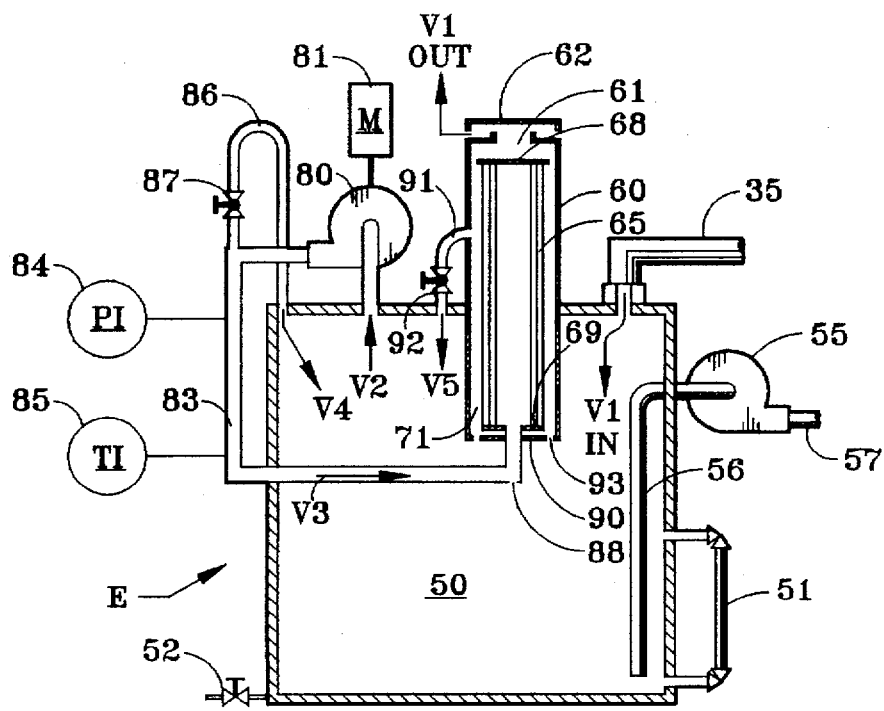
FIG. 3 is a schematic representation of a portion of demisting apparatus, similar to the one shown in FIG. 2, according to an alternate embodiment of the invention.

Some applications may require that the return oil mist header 35 operate at a slight negative pressure. To accommodate such a system, the demisting oil collection/supply apparatus E may be modified as shown in FIG. 3. In this modification, the lower end of the filter housing 60 is closed by an end plate 90 and the annular chamber 71 connected through a conduit 91 and valve 92 to the upper portion of the reservoir 50. With the valve 92 fully open, the volume V5 passes through the valve 92 without restriction and the resulting pressure in the reservoir 50 remains at atmospheric reference. As the valve 92 is closed, the blower 80 creates a negative pressure in the reservoir 50 in order to maintain the required volume V5 necessary to satisfy its suction volume V2. This negative pressure is transferred through the inlet connection of the return header 35. It will be noted that proper sized holes or vents 93 are necessary in the end plate 90 for coalesced oil to drain into the reservoir 50.

Thus, the present invention provides demisting apparatus for separating oil and air from oil mist supplied thereto, such as oil mist provided in an oil mist lubrication system. The oil may be collected and reused. Oil-free air may be vented to the atmosphere without contamination thereof. The demisting apparatus is designed so that it does not fail or create vacuum and pressure problems during operation of the system with which it is used. The demisting apparatus of the present invention is suitable for use with many oil mist lubricating systems, including petrochemical, refining, textile, pulp and paper industries.

Although two embodiments of the invention have been described herein, other variations of the invention can be made without departing from the spirit of the invention. Accordingly, it is intended that the invention be limited only by the claims which follow.

I claim:

1. Demisting apparatus for separating oil and air from oil mist supplied thereto, said apparatus comprising:
   an enclosed reservoir into which said oil mist flows;
   filter means connected to said reservoir, a first portion of which is vented to the atmosphere and another portion of which opens to the interior of said reservoir; and
   blower means having a suction connected to an upper portion of said reservoir for drawing oil mist therefrom and having a discharge connected to said filter means by a first conduit, a second conduit also connecting said first conduit to said reservoir so that a portion of said oil mist being discharged from said blower may be returned to said reservoir without passing through said filter means;
   said filter means including a filter element through which oil mist discharged from said blower means passes for separating oil and air therein, at least some of said air venting to said atmosphere through said first portion of said filter means, said oil draining through said another portion of said filter means for collection in said reservoir.

2. Demisting apparatus as set forth in claim 1 including valve means connected to said second conduit which, when closed, prevents any portion of said oil mist being discharged from said blower from flowing through said second conduit, said valve, when opened being adjustable to control the volume of said portion of said oil mist flowing through said second conduit.

3. Demisting apparatus as set forth in claim 2 including at least one of a pressure indicating device and a temperature indicating device is connected to said first conduit to aid in controlling the division of oil mist flow between said first and second conduits.

4. Demisting apparatus as set forth in claim 1 including another conduit connecting said filter means to said reservoir and through which a portion of said air separated by said filter element may be returned to said reservoir.

5. Demisting apparatus as set forth in claim 4 including valve means connected to said another conduit for controlling the amount of air to be returned to said reservoir.

6. Demisting apparatus for separating oil and air from oil mist supplied thereto, said apparatus comprising:
   an enclosed reservoir into which said oil mist flows;
   filter means connected to said reservoir, a first portion of which is vented to the atmosphere and another portion of which opens to the interior of said reservoir; and
   blower means having a suction connected to an upper portion of said reservoir for drawing oil mist therefrom and having a discharge connected by a conduit to said filter means;
   said filter means including a filter element through which oil mist discharged from said blower means passes for separating oil and air therein, at least some of said oil-free air venting to atmosphere through said first portion of said filter means, another conduit connecting said filter means to said reservoir and through which a portion of said air separated by said filter element may be returned to said reservoir; said oil draining through said another portion of said filter means for collection in said reservoir.

7. Demisting apparatus as set forth in claim 6 including valve means connected to said another conduit for controlling the amount of air to be returned to said reservoir.

8. Demisting apparatus for separating oil and air from oil mist supplied thereto, said apparatus comprising:
   an enclosed reservoir into which said oil mist flows:
   filter means connected to said reservoir, a first portion of which is vented to the atmosphere and another portion of which opens to the interior of said reservoir; and
   blower means having a suction connected to an upper portion of said reservoir for drawing oil mist therefrom and having a discharge connected to said filter means;
   said filter means comprising a chamber in which a filter element is disposed, said filter element having a first side which is in fluid communication with said oil mist being discharged from said blower means and a second side which is in fluid communication, through said chamber, with both said atmosphere and said reservoir interior, said oil mist flowing through said filter element, from said first side to said second side thereof, for separation into air and oil, said oil being drained into said reservoir interior, at least a portion of said air being vented to said atmosphere.

9. Demisting apparatus as set forth in claim 8 in which said blower discharge is connected to said first side of said filter element by a first conduit, another conduit connecting said chamber and said second side of said filter element to said reservoir interior permitting at least another portion of said air to be returned to said reservoir interior therethrough.

10. Demisting apparatus as set forth in claim 8 in which said chamber is vertically disposed extending upwardly from the top of said reservoir, said filter element being an elongated vertically disposed member having a hollow interior around which is provided said first side of said filter, the exterior of said filter element providing said second side of said filter element and defining, with the interior of said chamber surrounding said filter element, an annular chamber.

11. Demisting apparatus as set forth in claim 10 in which the upper end of said filter element interior is closed, the lower end of said filter element interior being opened for said communication with said oil mist being discharged from said blower means.

12. Demisting apparatus as set forth in claim 11 in which the upper end of said annular chamber is vented to said atmosphere.

13. Demisting apparatus as set forth in claim 12 in which the lower end of said annular chamber opens into said reservoir interior allowing oil therein to drain into said reservoir interior.

14. Demisting apparatus as set forth in claim 12 in which the lower end of said annular chamber is at least partially closed, said annular chamber being connected to said reservoir interior above the lower end thereof by a conduit through which some of said air in said annular chamber may flow into said reservoir interior without being vented to said atmosphere.

15. Demisting apparatus as set forth in claim 14 including valve means in said conduit for controlling the volume of said some of said air flowing into said reservoir interior.

16. Demisting apparatus as set forth in claim 14 in which the lower end of said annular chamber is provided with one or more apertures through which oil from said annular chamber may drain into said reservoir interior.

* * * * *